July 24, 1962 S. W. HERRICK 3,046,034
CANOE, BOAT, ETC., CARRIER
Filed March 17, 1960 2 Sheets-Sheet 1

Samuel W. Herrick
INVENTOR.

BY *Clarence A. O'Brien*
*and Harvey B. Jacobson*
Attorneys

July 24, 1962 S. W. HERRICK 3,046,034
CANOE, BOAT, ETC., CARRIER
Filed March 17, 1960 2 Sheets-Sheet 2
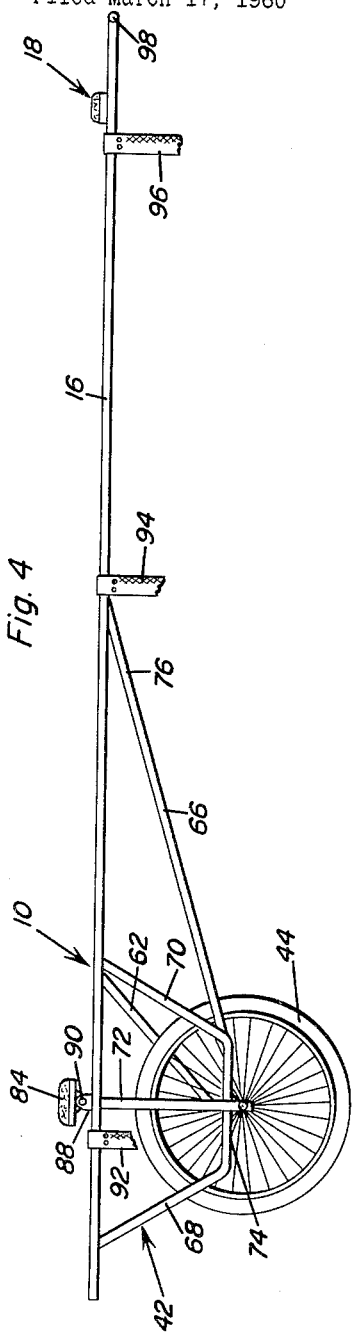
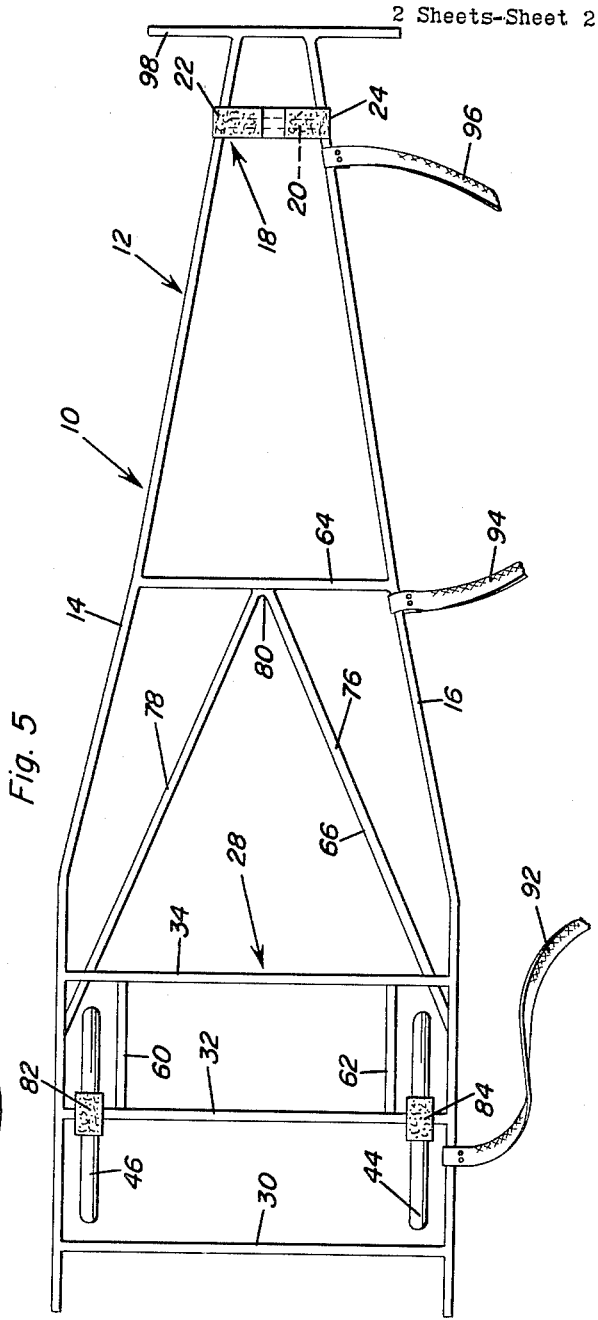
Samuel W. Herrick
INVENTOR.

United States Patent Office 3,046,034
Patented July 24, 1962

3,046,034
CANOE, BOAT, ETC., CARRIER
Samuel W. Herrick, Elm St., Guilford, Maine, assignor of one-half to Paul E. Herrick, Harmony, Maine
Filed Mar. 17, 1960, Ser. No. 15,701
4 Claims. (Cl. 280—35)

This invention relates to a wheeled boat carrier and more particularly to a boat carrier for transporting small and light boats.

Many of the smaller camping and fishing boats being produced today are constructed of sheet aluminum to provide a boat which can be conveniently handled by one or two persons. Although many times it is desirable to trail a boat behind a towing vehicle with the boat secured on a trailer, the lighter boats made of aluminum and other light materials may be in most cases more conveniently carried on top of a vehicle. However, a vehicle used by fishermen and the like cannot always be driven to a position closely adjacent the water in which the boat being carried is to be placed. In this instance, a boat carried on the top of a vehicle must be unloaded from the vehicle and then transported by hand the distance to the water. In some cases the distance a boat must be carried is considerable and therefore the carrying of the boat becomes tiresome and almost impossible without frequent stops for rest.

It is the main object of this invention to provide a wheeled boat carrier which may have a light weight boat secured thereto prior to the placement of the boat on top of the carrying vehicle. In this manner, the boat and the wheeled carrier are carried in an inverted position on top of the vehicle being used for transportation to the water. Of course, it is not desirable to use conventional types of trailers for this purpose inasmuch as conventional trailers are constructed of heavy materials enabling them to be trailed over the highways at highway speeds.

It is therefore another object of this invention to provide a wheeled boat carrier of extremely light construction but which will be strong enough to carry a light weight boat at walking speeds.

Still another object of this invention is to provide a wheeled boat carrier constructed in a manner which will enable the rigidity of the boat being carried by the trailer to function as a structural support or brace for the extremely light construction of the wheeled carrier.

A further object of this invention is to provide a wheeled carrier devoid of suspension springing, levers, hinges and folding parts, etc. which would necessarily increase the weight of the carrier.

A final object to be specifically enumerated herein is to provide a boat carrier which will conform to conventional forms of manufacture, be of simple construction and easy to use so as to provide a device that will be economically feasible, light weight and useful for its intended purpose.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged side elevational view of the boat carrier with portions of the tie down straps being broken away; and FIGURE 5 is a top plan view of the boat carrier shown in FIGURE 4.

Figure 1:
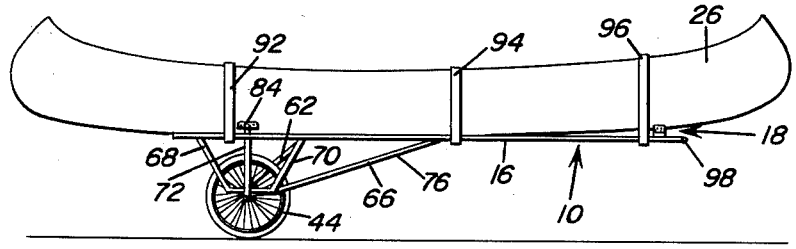
FIGURE 1 is a side elevational view of the boat carrier shown with a canoe secured thereon.

Referring now more specifically to the drawings, the numeral 10 generally designates the boat carrier which includes an elongated support frame generally designated by the reference numeral 12. The support frame 12 comprises a pair of opposite side members 14 and 16 which are parallel at their rear ends and are convergent at their forward ends. A support block generally designated by the reference numeral 18 is secured in any convenient manner between the forward end portions of the side members 14 and 16. The support block includes a transverse support member 20 that is secured between confronting surfaces of the side members 14 and 16. A pair of resilient supports 22 and 24 are secured to the upper surfaces of the support block 18 for engaging and supporting the keel of the boat 26 adjacent the bow thereof.

An abridgment structure generally designated by the reference numeral 28 is secured between the parallel rear end portions of the side members 14 and 16. The abridgment structure 28 includes three longitudinally spaced and transversely extending brace members 30, 32 and 34 which have their opposite end portions secured to the confronting surfaces of the side members 14 and 16 in any convenient manner. The abridgment structure 28 also includes a pair of transversely spaced and depending wheel assemblies 36 and 38.

Each of the wheel assemblies includes a pair of transversely spaced and depending support frames 40 and 42. A pair of wheels 44 and 46 are rotatably journaled between the lower extremities of each pair of support frames 38 and 40 for rotation about aligned transversely extending axes. It is to be noted that the wheels 44 and 46 may be journaled for rotation in any convenient manner.

Each of the wheel assemblies 36 and 38 include a depending support 48 which has its upper end secured to the transverse brace member 32 a spaced distance inwardly of the corresponding end thereof. An inverted V-shaped brace member generally referred to by the reference numeral 50 has the lower ends of its arms 52 and 54 secured to the lower end portions of the depending supports 48 and the bight portion 56 of the inverted V-shaped brace member 50 is secured to the mid-portion of the intermediate brace member 32 in any convenient manner such as by welding 58. A pair of inclined braces 60 and 62 extend longitudinally of the frame 12 and are secured between the lower portion of each of the depending supports 48 and the forwardmost transverse brace member 34, see FIGURE 5 in particular. A center transverse brace member 64 is secured between the side members 14 and 16 intermediate their ends in any convenient manner, see FIGURES 4 and 5 in particular. The wheel assemblies 36 and 38 are also braced to the center transverse brace member 64 by means of an inverted and inclined V-shaped brace member 66.

The outer support frames 42 each include a generally V-shaped frame with the upper ends of the arms 68 and 70 secured to the side members 14 and 16 at the intersection between the side members and the opposite ends of the forwardmost and rearmost transvers brace members 30 and 34. Each of the outer support frames 42 also includes a vertical brace 72 which is secured between the bight portion 74 of each of the frames 42 and the adjacent side member at its inner section with the intermediate transverse brace member 32.

It will be noted that the inverted and inclined V-shaped brace member 66 has the lowermost ends of its arms 76 and 78 secured to the forward ends of the bight portions 74 of the outer support frames 42. The apex 80 of the V-shaped brace member 66 is secured to the mid-portion of the center brace member 64 in any convenient manner.

A pair of support mounts 82 and 84 are secured to opposite ends of the abridgement structure 28 for movement about transversely extending aligned axes. The support mounts 82 and 84 have a depending apertured lug 86 which is secured between the furcations 88 by means of a pivot bolt 90.

A plurality of tensioning members 92, 94 and 96 which each comprise a flexible strap are secured to the side member 16 at points spaced longitudinally therealong. The free end portions of the tensioning members 92, 94 and 96 are adapted for engagement with the opposite side member 14 in any convenient manner. Further, a transversely extending handle 98 is secured between the forward ends of the side members 14 and 16 and it will be noted that the handle 98 projects transversely beyond the opposite sides of the side members 14 and 16.

Figure 2:
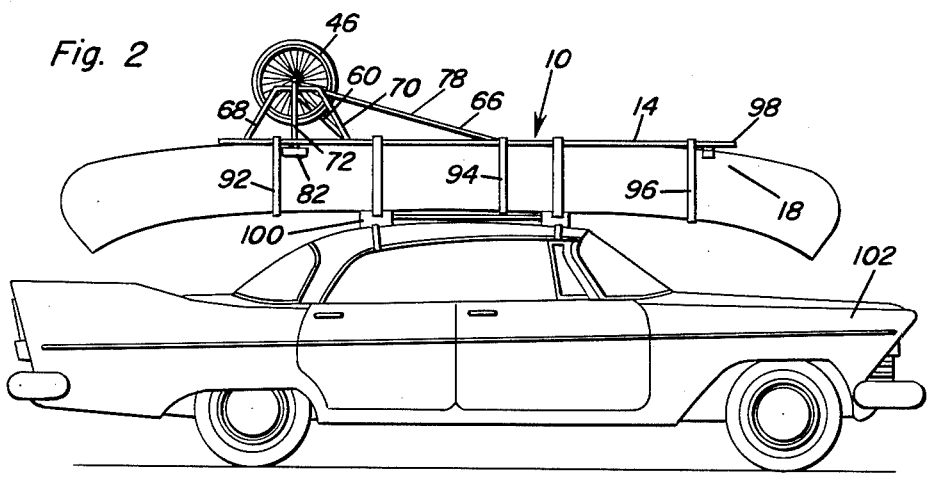
FIGURE 2 is a side elevational view of the assembly shown in FIGURE 1 in an inverted position mounted upon the top of a vehicle.
Figure 3:
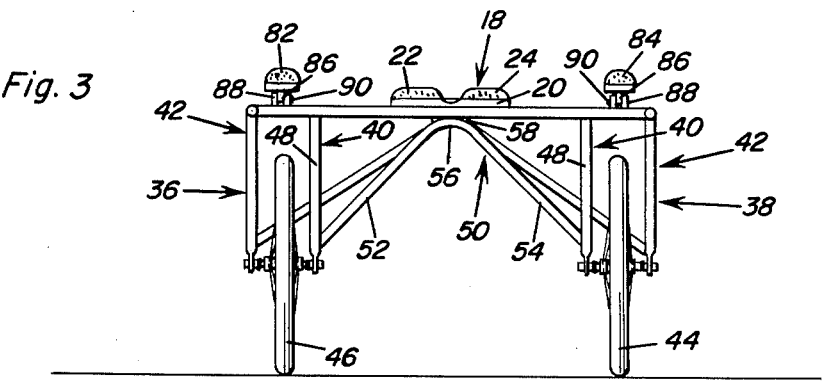
FIGURE 3 is a rear end elevational view on somewhat of an enlarged scale of the boat carrier.

In operation, the boat 26 is placed on the boat carrier 10 in a manner illustrated in FIGURE 1 and the tensioning members 92, 94 and 96 are then passed over the upper surfaces of the boat 26 and their free ends are secured to the side member 14 in any convenient manner such as knotting. The boat 26 and the carrier 10 may then be inverted as shown in FIGURE 2 and secured to the carrying rack 100 on top of the vehicle 102 in any convenient manner.

After having reached the destination, the boat 26 and carrier 10 may then be removed from on top of the vehicle 102. The handle 98 of the carrier 10 may then be grasped to guide the boat during its trip to the water where it is to be used.

It is to be understood that the boat carrier 10 is constructed of suitable light weight tubular elements and that the manner in which the boat 26 is strapped to the carrier 10 by means of the tensioning members 92, 94 and 96 provides additional bracing for the frame 12 of the boat carrier 10 during its use to carry the boat 26 to the point of use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A wheeled boat carrier including an elongated support frame generally horizontal and rectangular in plan and having opposite side members, said side members converging at the forward end of said frame, a support block secured between said side members at the forward end of said frame and adapted to support the keel of a boat adjacent its bow, an elongated abridgment structure secured between said side members at the rear end of said frame, said abridgment structure including a pair of transversely spaced, depending wheel assemblies, said wheel assemblies each including a pair of transversely spaced depending inner and outer support frames, a pair of wheels, means journalling a wheel between the lower extremities of each pair of support frames for rotation about aligned transversely extending axes, support mounts secured to opposite end portions of said abridgment structure adapted to support the undersurfaces of the midportion of a boat, and a plurality of elongated flexible tensioning members each having one end secured to one of said side members, said tensioning members being spaced longitudinally of said one side member and being adapted at their other ends for engagement with the other side member to embrace the upper surfaces of a boat supported by said frame, said abridgment structure including three longitudinally spaced and transversely extending brace members secured between said side members, each outer support frame of said wheel assemblies including a generally V-shaped frame with the upper ends of the arms thereof secured to said side members at the intersection between the latter and the opposite ends of the forwardmost and rearmost brace members, vertical braces secured between the lower ends of said V-shaped frames and said side members at the intersection between the latter and the opposite ends of the intermediate brace member, the inner support frames of said wheel assemblies each including a depending support having its upper end secured to said intermediate brace member inwardly of said arms, an inverted V-shaped brace member, the lower ends of the arms of said inverted V-shaped brace member secured to the lower end portions of said depending supports, the apex of said V-shaped brace member secured to one of said transversely extending brace members at its mid-portion, an inclined longitudinally extending brace secured between the lower portion of each of said depending supports and the forwardmost brace member inwardly of its opposite ends.

2. The combination of claim 1 including a transversely extending handle secured between the forward ends of said side members, the opposite ends of said handle projecting beyond the remote surfaces of said side members.

3. The combination of claim 1 wherein each of said support mounts are pivotally secured to said abridgment structure for movement about transversely extending and aligned axes.

4. A wheeled boat carrier including an elongated support frame generally horizontal and rectangular in plan and having opposite side members, said side members converging at the forward end of said frame, a support block secured between said side members at the forward end of said frame and adapted to support the keel of a boat adjacent its bow, an elongated abridgment structure secured between said side members at the rear end of said frame, said abridgment structure including a pair of transversely spaced, depending wheel assemblies, said wheel assemblies each including a pair of transversely spaced depending inner and outer support frames, a pair of wheels, means journalling a wheel between the lower extremities of each pair of support frames for rotation about aligned transversely extending axes, support mounts secured to opposite end portions of said abridgment structure adapted to support the undersurfaces of the midportion of a boat, and a plurality of elongated flexible tensioning members each having one end secured to one of said side members, said tensioning members being spaced longitudinally of said one side member and being adapted at their other ends for engagement with the other side member to embrace the upper surfaces of a boat supported by said frame, said abridgment structure including three longitudinally spaced and transversely extending brace members secured between said side members, the outer support frame of said wheel assemblies each including a generally V-shaped frame with the upper ends of the arms thereof secured to said side members at the intersection between the latter and the opposite ends of the forwardmost and rearmost brace members, and vertical braces secured between the lower ends of said V-shaped frames and said side members at the intersection between the latter and the opposite ends of the intermediate brace member, an inverted V-shaped brace member, the lower ends of the arms of said inverted V-shaped brace member secured to the lower portions of said depending V-shaped frames, said frame including a transverse brace member secured between said side members between said abridgment structure and the forward end of said frame, the apex of said inverted V-shaped brace member secured to said last mentioned transverse brace member intermediate its opposite ends.

(References on following page)

References Cited in the file of this patent

UNITED STATES PATENTS

| | | |
|---|---|---|
| 1,573,318 | Huber | Feb. 16, 1926 |
| 2,503,535 | Yarbrough | Apr. 11, 1950 |
| 2,603,501 | Graves | July 15, 1952 |
| 2,608,418 | Finlayson | Aug. 26, 1952 |
| 2,676,716 | Sallis | Apr. 27, 1954 |
| 2,700,480 | Triplett | Jan. 25, 1955 |
| 2,856,087 | Steber | Oct. 14, 1958 |